US012332957B2

(12) United States Patent
Ikeda et al.

(10) Patent No.: US 12,332,957 B2
(45) Date of Patent: *Jun. 17, 2025

(54) INDICATING LOCATION STATUS

(71) Applicant: GOOGLE LLC, Mountain View, CA (US)

(72) Inventors: Daisuke Ikeda, Sunnyvale, CA (US); Ryoichi Imaizumi, Tokyo (JP); Kaleigh S. Smith, New York, NY (US); Keiji Maekawa, Tokyo (JP)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,779

(22) Filed: Mar. 4, 2024

(65) Prior Publication Data

US 2024/0248940 A1 Jul. 25, 2024

Related U.S. Application Data

(63) Continuation of application No. 17/976,175, filed on Oct. 28, 2022, now Pat. No. 11,921,803, which is a
(Continued)

(51) Int. Cl.
*G06F 16/9535* (2019.01)
*G06F 16/2457* (2019.01)
(Continued)

(52) U.S. Cl.
CPC .... *G06F 16/9535* (2019.01); *G06F 16/24575* (2019.01); *G06F 16/24578* (2019.01);
(Continued)

(58) Field of Classification Search
None
See application file for complete search history.

(56) References Cited

U.S. PATENT DOCUMENTS 7,847,688 B2 12/2010 Atkins et al.
9,460,218 B2 10/2016 Ikeda et al.
(Continued)

FOREIGN PATENT DOCUMENTS

JP 10160491 6/1998
JP 10171819 6/1998
(Continued)

OTHER PUBLICATIONS

The Japanese Patent Office; Notice of Allowance issued in Application No. 2017-039097 dated Sep. 2, 2019.
(Continued)

*Primary Examiner* — Thu N Nguyen
(74) *Attorney, Agent, or Firm* — Gray Ice Higdon

(57) ABSTRACT

Methods, systems, and apparatus, including computer programs encoded on a computer storage medium, for indicating location status. A computing device can receive a query from a user device, a current time, and a location for the user device. The computing device identifies results responsive to the query, including one or more business results that are each associated with a business location and operating hours. The computing device can select a subset of the business results as open results based on the operating hours of the business results, the current time, and travel times from the device location to the respective business locations. Data can be provided for a search engine results page that designates the subset of the business results as open results.

18 Claims, 5 Drawing Sheets

Related U.S. Application Data continuation of application No. 16/294,361, filed on Mar. 6, 2019, now Pat. No. 11,487,830, which is a continuation of application No. 15/631,102, filed on Jun. 23, 2017, now Pat. No. 10,268,770, which is a continuation of application No. 15/254,604, filed on Sep. 1, 2016, now Pat. No. 9,720,933, which is a continuation of application No. 13/658,933, filed on Oct. 24, 2012, now Pat. No. 9,460,218.

(60) Provisional application No. 61/551,828, filed on Oct. 26, 2011.

(51) Int. Cl.
*G06F 16/248* (2019.01)
*G06F 16/29* (2019.01)
*G06F 16/9537* (2019.01)
*G06F 16/9538* (2019.01)

(52) U.S. Cl.
CPC ............ *G06F 16/248* (2019.01); *G06F 16/29* (2019.01); *G06F 16/9537* (2019.01); *G06F 16/9538* (2019.01)

(56) References Cited

U.S. PATENT DOCUMENTS

| | | |
|---|---|---|
| 9,720,933 B2 | 8/2017 | Ikeda et al. |
| 10,268,770 B2 | 4/2019 | Ikeda et al. |
| 11,487,830 B2 | 11/2022 | Ikeda et al. |
| 2004/0030689 A1 | 2/2004 | Anderson et al. |
| 2007/0174770 A1 | 7/2007 | Safoutin |
| 2008/0082253 A1 | 4/2008 | Oguchi et al. |
| 2009/0100018 A1 | 4/2009 | Roberts |
| 2009/0105941 A1 | 4/2009 | Johnston et al. |
| 2009/0222438 A1 | 9/2009 | Strandell et al. |
| 2010/0057358 A1 | 3/2010 | Winer et al. |
| 2010/0094910 A1 | 4/2010 | Bayliss |
| 2010/0106411 A1* | 4/2010 | Nirhamo ............ G08G 1/0969 701/533 |
| 2010/0123737 A1 | 5/2010 | Williamson et al. |
| 2010/0138151 A1 | 6/2010 | Jang et al. |
| 2010/0161215 A1 | 6/2010 | Karani |
| 2010/0168996 A1 | 7/2010 | Bourque et al. |
| 2011/0072046 A1 | 3/2011 | Chi |
| 2011/0077046 A1 | 3/2011 | Durand et al. |
| 2011/0167058 A1 | 7/2011 | van Os |
| 2011/0289015 A1 | 11/2011 | Mei et al. |
| 2012/0023088 A1 | 1/2012 | Cheng et al. |
| 2012/0036115 A1 | 2/2012 | Horii et al. |
| 2013/0110822 A1 | 5/2013 | Ikeda et al. |
| 2016/0371302 A1 | 12/2016 | Ikeda et al. |
| 2017/0293694 A1 | 10/2017 | Ikeda et al. |
| 2019/0205351 A1 | 7/2019 | Ikeda et al. |

FOREIGN PATENT DOCUMENTS

| | | |
|---|---|---|
| JP | 2001165680 | 6/2001 |
| JP | 2009103504 | 5/2009 |
| JP | 2010127946 | 6/2010 |
| JP | 2010127948 | 6/2010 |
| JP | 2011086066 | 4/2011 |
| WO | 2012030793 | 3/2012 |

OTHER PUBLICATIONS

Australian Intellectual Property Office; Notice of Allowance issued in Application No. 2012328895; dated Oct. 6, 2017.
Open Table Restaurant Reservation Washington, DC Restaurants; Maryland Restaurants; 2 pages; downloaded from the internet dated Jul. 2011.
Yelp; Real people; Real reviews; 1 page; downloaded from the internet dated Jul. 2011.
The Japan Patent Office, Office Action for Japanese Patent Application No. 2017-039097, 7 pages, dated Apr. 9, 2018.
Canadian Intellectual Property Office; Office Action issued in Application No. 2,851,818 dated May 31, 2018.
The Japanese Patent Office; Decision of Rejection issued in Application No. 2017-039097 dated Jan. 11, 2019 1.
Canadian Intellectual Property Office; Office Action issued in Application No. 2,851,818 dated May 22, 2019.
European Patent Office; Notification of Transmittal of the International Search Report and the Written Opinion of the International Searching Authority issued in Application No. PCT/US2012/061654; 12 pages; dated Jan. 4, 2013.
The Japanese Patent Office; Notification of Rejection issued in Application No. 2014-538918; 13 pages dated Jun. 29, 2016.
European Patent Office; International Preliminary Report of Patentability in International Application No. PCT/US2012/061654; 6 pages; dated Oct. 1, 2014.
Australian Patent Office; First Examination Report issued in Application No. 2012328895 3 pages, dated ; Feb. 17, 2017.

\* cited by examiner

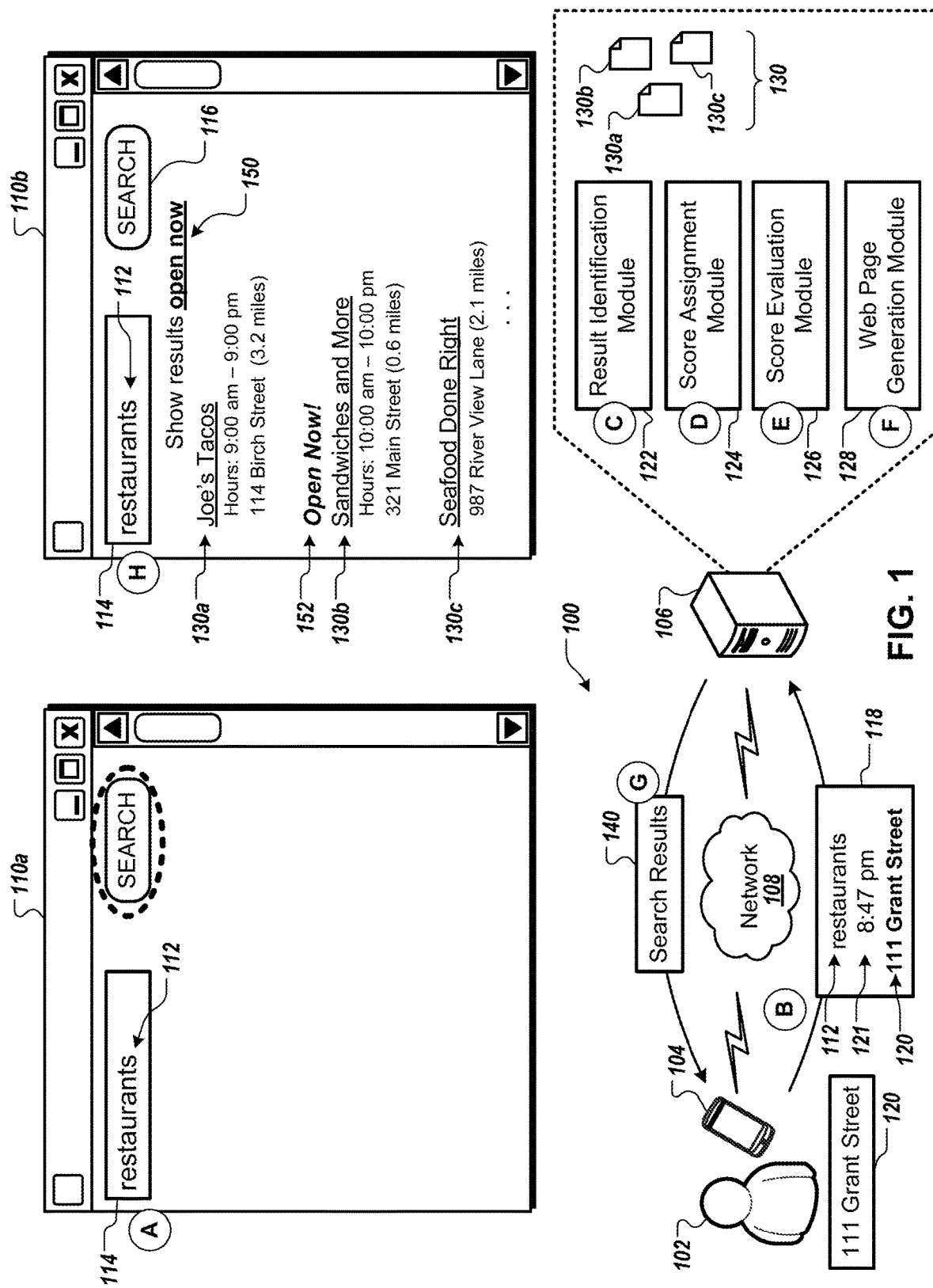

| | Result 130a | Result 130b | Result 130c | |
|---|---|---|---|---|
| Operating Hours: | 9:00am – 9:00pm | 10:00am – 10:00pm | unknown | ⟵ 210 |
| Confidence Score<br>(Likelihood open at 8:47pm) | 80% | 90% | 0% | ⟵ 220 |
| Location: | 114 Birch Street | 321 Main Street | --- | ⟵ 230 |
| Distance: | 3.2 mi | 0.6 mi | --- | ⟵ 240 |
| Estimated Travel Time: | 16 minutes | 3 minutes | --- | ⟵ 250 |
| Estimated Arrival Time: | 9:03 pm | 8:50 pm | --- | ⟵ 260 |
| Arrival Confidence Score<br>(Likelihood of user arriving while location is open) | 40% | 90% | 0% | ⟵ 270 |
| Composite Score | 30% | 90% | 0% | ⟵ 280 |

Current Location: 111 Grant Street ⟵ 120

Current Time: 8:47 pm ⟵ 121

FIG. 2

INDICATING LOCATION STATUS

BACKGROUND

This document relates to processing search queries and providing search results.

Internet search engines identify resources (e.g., web pages, images, text documents, multimedia content) that are relevant to a user's information needs, and present information about the resources to the user. Typically, users submit queries that suggest the information the users want to retrieve, and search engines provide search results that are responsive to the queries. Some results may correspond to businesses that have limited operating hours.

SUMMARY

In response to a query received from a computing device, a search engine system can identify search results, including business results that are associated with business locations. The search engine system can determine whether business results should be designated as open at a particular time based on operating hours associated with the business results and a location associated with the query. For example, the query can indicate the location of the computing device. Using a travel time between the location of the computing device and a business location, the search engine system can determine whether to designate the business location as being open. The search engine system then provides information that indicates which business locations are designated as open at the particular time of interest.

Particular business locations can be designated as open at a particular time, for example, at the current time or at a time in the future. Whether to designate a location as open can be determined based on the location of a user. A control can be provided that responds to user interaction to alter the display of the results, for example, by reordering or filtering the results.

In appropriate circumstances, users may be provided with an opportunity to opt in/out of programs or features that may collect personal information (e.g., information about a user's preferences or a user's current location). User information that is used to identify unique users, unique addresses or other user-related history can be anonymized so that the privacy of users is protected. For example, quasi-unique identifiers can be associated with users, but the actual identifying information of the users is not stored. Additionally, any identified user preferences or user interactions can be generalized (for example, generalized based on user demographics) rather than associated with a particular user. Encryption and obfuscation techniques can also be used to protect the privacy of users.

One innovative aspect of the subject matter described in this specification is embodied in methods that include the actions of: receiving a query from a user device, a current time, and a location for the user device; identifying results responsive to the query, the results including one or more business results that are each associated with a business location and operating hours; selecting a subset of the business results as open results based on the operating hours of the business results, the current time, and travel times from the device location to the respective business locations; and providing data for a search engine results page that designates the subset of business results as open results.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. For instance, selecting the subset of the business results as the open results includes determining an arrival time to the business location for each business result responsive to the query by adding to the current time the travel time to the business location for each business result, and determining that the arrival time to the business location for the business result occurs between a beginning and an end of the operating hours associated with the business result. Providing the data for the search engine results page that designates the subset of business results as open results includes providing a label for display on the results page designating at least a subset of the business results as being open now results, and designating the subset of business results that are open results for display beneath the open now label. Providing the data for the search engine results page that designates the subset of business results as open results includes providing data for a control on the search engine results page that allows a user to toggle a display of results based on whether or not the results are open results. Interaction with the control is detected, and data for a second search engine results page that only displays the subset of business results that are open results is provided. It is determined that a number of open results is above a predetermined threshold. Selecting a subset of the business results as open results includes generating, for each of the business results responsive to the query, a confidence score indicating a likelihood that the business location for the business result is open, and selecting each of the business results for which the confidence score is above a threshold for inclusion in the subset of business results.

Selecting the subset of the business results as the open results includes selecting the subset of the business results as the open results based on a proximity of a time associated with the query to a beginning and an end of the operating hours. Providing the data for the search engine results page includes providing data that, when rendered, displays a control that, in response to user interaction with the control, alters a display of results based on whether or not the results are open results. The control filters or reorders the results based on whether the results are open results. Providing the data for the search engine results page includes: detecting user interaction with the control; and in response to detecting user interaction with the control, providing the data for the search engine results page that designates the open results as open. Determining a number of the open results; and determining that the number of open results meets a predetermined threshold; where providing data that, when rendered, displays a control that alters a display of results is performed in response to determining that the number of the open results meets the predetermined threshold.

Determining that a number of open results meets a first threshold; and determining that a second number of results identified meets a second threshold; where providing data that, when rendered, displays a control that alters a display of results is performed in response to (i) determining that the number of open results meets the first threshold and (ii) determining that the number of results identified meets the second threshold. Selecting a subset of the business results as open results includes: generating, for each of the business results, a confidence score indicating a likelihood that the business result is open at a particular time; and selecting a set of the business results as open results, the business results in the set being those business results for which the confidence score meets a threshold. Determining a time zone associated with the device location, where selecting the subset of the business results as open results includes selecting the subset of results as open results using the determined time zone.

Selecting the subset of the business results as the open results includes estimating travel times from the device location to the respective business locations; based on the estimated travel times, generating, for each of the business results, a score indicating a likelihood that a user can arrive at the business location associated with the business result during the operating hours associated with the business result; and selecting a set of the business results as open results, the business results in the set being those business results for which the score meets a threshold. Selecting the subset of the business results as the open results comprises: determining a distance between the device location and the respective business locations; generating, for each of the business results, a score based on the distance between the device location and the business location associated with the business result; and selecting a set of the business results as open results, the business results in the set being those business results for which the score meets a threshold.

Advantageous implementations can include one or more of the following features. Search results can identify businesses that are open at a particular time. Whether businesses are designated as open can be personalized based on the location of a user. A business can be designated as open when an estimated arrival time at a location for the business is within the operating hours of the business. A user interface element can respond to user interaction to indicate results that are open at a particular time. The user interface element can rank or filter search results such that results designated as open at a particular time are presented. The user interface element can be selectively presented, for example, based on characteristics of a search results set.

The details of one or more embodiments are set forth in the accompanying drawings and the description below. Other features and advantages will become apparent from the description, the drawings, and the claims.

BRIEF DESCRIPTION OF THE DRAWINGS

FIG. 1 is a diagram that illustrates an example environment in which location status is indicated.

FIG. 2 is a diagram that illustrates examples of data that can be used to designate location status.

Like reference numbers and designations in the various drawings indicate like elements.

DETAILED DESCRIPTION

Figure 3B:
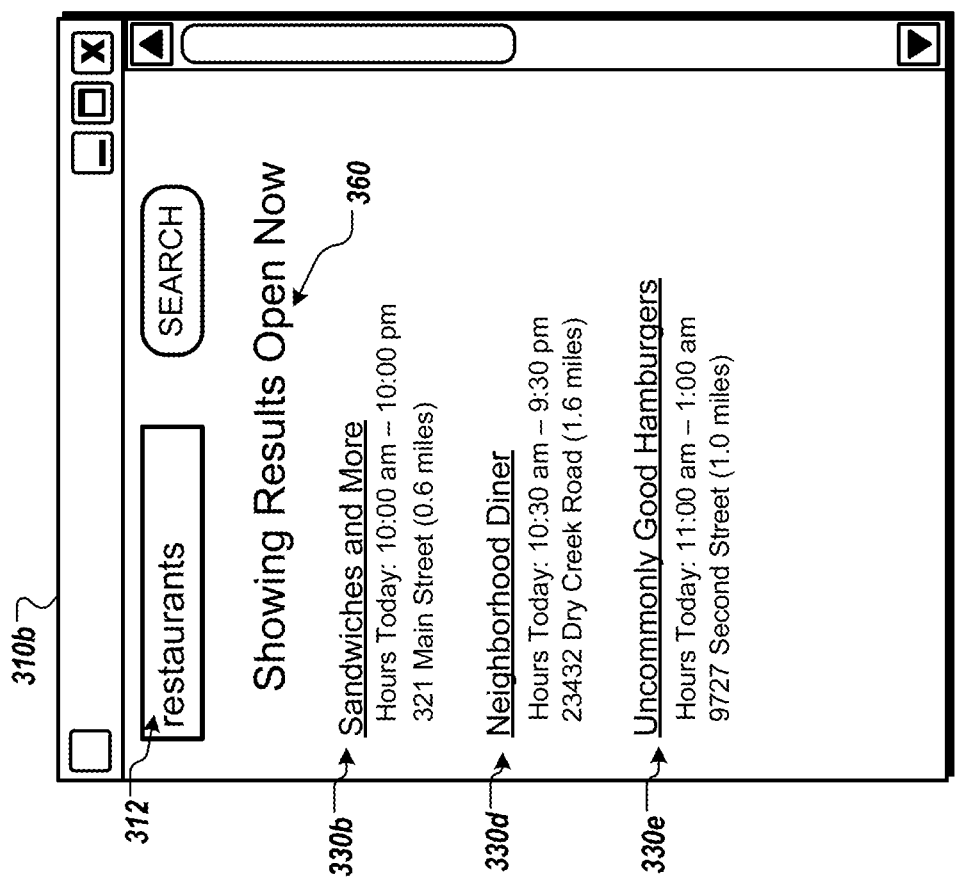
FIG. 3A, FIG. 3B, FIG. 4A and FIG. 4B are diagrams that illustrate examples of user interfaces for indicating location status.

FIG. 1 is a diagram that illustrates an example environment 100 in which location status is indicated. The environment 100 includes a computing device 104 and a server system 106 that communicate over a network 108. The diagram shows states (A) to (H), which may occur in the sequence illustrated or in a different sequence. States (B) to (G) illustrate a flow of data, and states (A) and (H) illustrate user interfaces 110a, 110b.

The computing device 104 can be, for example, a desktop computer, a laptop computer, a cellular phone, a smartphone, a personal digital assistant (PDA), a tablet computer, a navigation system, or another computing device. The operations performed by the server system 106 can be performed by individual computer systems or can be distributed across multiple computer systems. The network 108 can be a wired or wireless network or a combination of both. The network 108 can include one or more public or private networks, and can include the Internet.

Users often use search engine systems to find information about businesses and places near them. When a user reviews search results, it can be useful to know whether a business identified in the search results is open or not. Accordingly, the status of businesses and their associated locations can be presented in response to a search query. As used herein, location status refers to the accessibility of a location, for example, whether a business at the location is open.

In general, businesses that are open at a particular time can be distinguished from businesses that are either closed at the particular time or cannot be verified as open. By indicating on a search engine results page that a business is open (or by excluding businesses that are not considered to be open), users can quickly identify businesses that are open at a time of interest.

As an example, a user may desire to find businesses that are relevant to the user's query and are open at the current time that the query is submitted. Businesses that are currently open can be indicated to be "open now". In some implementations, a filter control can be provided on a search engine results page that allows the user to filter out search results for businesses that are not open, leaving only open results being displayed.

Businesses can include commercial entities and non-commercial entities, such as governments and non-profit organizations. Businesses can be associated with one or more business locations (e.g., geographical areas). Business locations can include parks, schools, libraries, and other locations where other non-commercial activities take place, in addition to stores, restaurants, theaters, and other commercial locations. In some implementations, business locations can be any publicly accessible location, regardless of the purposes of or activities at the location. Thus in some implementations, businesses are not limited to any particular purpose or activity.

Businesses have operating hours, which can be scheduled time periods during which business can be conducted. For example, operating hours can indicate when a business location is accessible (e.g., when entry to a location is permitted, or physical facilities are available), or when services at the business location are provided.

To determine whether to indicate a business as open, the server system 106 can access information about the operating hours of the businesses. If the current time (or another time of interest) falls within the operating hours of a business, the server system 106 can indicate that the business is open.

In addition, or as an alternative, the server system 106 can use other information to enhance the usefulness of status indications provided to users. For example, the server system 106 can take into account the distance between a user's location and the business locations of businesses in the search results. Travel times for travel between the location of a user's computing device and the business locations of the businesses can be determined. The server system 106 can adjust the status indicated for the businesses based on the travel times. For example, businesses can be designated as open when, based on the distance between the user's location and the business locations, it is reasonable that the user could be expected to arrive at the business locations within the operating hours. When it is not reasonable to expect that the user can arriving within the operating hours, the businesses are not indicated as being open, irrespective of whether the current time is within the operating hours.

As an example, the server system 106 can receive a query from a user device, such as the computing device 104. The server system 106 can also receive a current time and a location of the computing device 104. The server system 106 can identify results responsive to the query. The results can include one or more business results that are each associated with a business location and operating hours. The server system 106 can also select a subset of the business results as open results based on the operating hours of the business results, the current time, and travel times from the device location to the respective business locations. The server system 106 then provides data for a search engine results page that designates the subset of the business results as open results.

For purposes of example, assume that in state (A), a user 102 enters a query 112 at the computing device 104 and initiates a search using the query 112. The query 112 can include, for example, an n-gram of characters, which can include one or more query terms.

In the illustrated example, the user interface 110*a* of the computing device 104 includes an input field 114 (e.g., a text entry box) and a search control 116. The user 102 enters the query 112, "restaurants", into the input field 114 and initiates a search by clicking on or otherwise interacting with (e.g., hovering a pointer over or providing voice commands that cause selection of) the search control 116.

In state (B), the computing device 104 sends a request 118 to the server system 106. For example, the request 118 can request a resource or data that provides results responsive to the query 112. The request 118 includes the query 112 and indicates a geographical location associated with the query 112. The request 118 can also include a time 121 associated with the query 112, for example, a time that the request 118 is sent.

The geographical location associated with the query 112 can be a device location 120 of the computing device 104, for example, the current location of the computing device 104. As described above, the device location 120 can be provided when, for example, the user 102 gives permission for the location information to be submitted to and used by the server system 106. For example, the user 102 can "opt-in" to enable the use of location information or "opt-out" so that location information is not used. The device location 120 can also be anonymized such that the device location 120 cannot be linked to the user 102.

To determine the device location 120, the computing device 104 can determine its current location using, for example, a global positioning system (GPS) receiver module. As an alternative, a user can enter a device location 120, for example, an address, zip code, city or other information that indicates the location of the computing device 104. The computing device 104 or the server system 106 can determine the location of the computing device 104 based on, for example, an IP address for the computing device 104, information about the location of a wireless access point or a nearby cellular network cell site to which the computing device 104 is connected, or using other techniques.

In some implementations, the computing device 104 or the server system 106 estimates the device location 120 using information about the user 102 to which the user 102 has approved access. For example, if the user 102 has enabled access to calendar data or a travel itinerary for the user 102, the computing device 104 can access to determine the scheduled location of the user 102 and thus the scheduled location of the computing device 104.

As an alternative, the device location 120 can also be a stored location for the computing device 104, for example, a default location or a previous location for the computing device 104. The stored location can be a recent location of the computing device 104, such as the last known location, or a frequent location of the computing device 104. The stored location can be stored on the computing device 104 (e.g., as a cookie) or on the server system 106 (e.g., in a user profile for the user 102). The request 118 can indirectly indicate a stored location, for example, by including an anonymized user identifier for the user 102, permitting the server system 106 to access the information about the stored location for the computing device 104.

In state (C), the server system 106 receives the request 118 and identifies search results 130 that are responsive to the query 112. For example, server system 106 can include a result identification module 122 that identifies the search results 130 that are relevant to one or more of the terms of the query 112. In the illustrated example, each of the search results 130 represents a restaurant location.

The search results 130 can include one or more business results 130*a*-130*c*. Each business result 130*a*-130*c* represents a business and is associated with a corresponding business location, for example, a geographical location, and operating hours that represent, for example, dates and times that the corresponding business location is accessible. A business location can be accessible, and thus can be considered to be open, at times when, for example, entry to or presence at the business location by the public is permitted, services are provided at the business location, or when both conditions occur. Business results can be, but are not required to be, associated with a particular entity or organization.

Briefly, in states (D) and (E), the server system 106 determines whether the business results 130*a*-130*c* should be designated as being open. For example, the server system 106 can access information about the operating hours of each of the business results 130*a*-130*c*, and select a subset of the business results 130*a*-130*c* as open results if the current time is within the operating hours for the respective business results 130*a*-130*c*.

Because the user 102 is likely located at some distance from the locations of the business results 130*a*-130*c*, the server system 106 can use the device location 120 associated with the query 112 to enhance the status information provided to the user. For example, the server system 106 can select the business results 130*a*-130*c* as open when the user 102 is expected to arrive at the business locations within the operating hours. Thus the set of business results 130*a*-130*c* that the server system 106 designated to be "open now" or open at a particular time may be different from the set of locations that are actually open at the time.

As an example, when a business is currently open, but the user does not have enough time to travel to the business before it closes, the server system 106 does not designate the location as being open. Similarly, if a business is currently closed but will open by the time the user is expected to arrive, the business can be designated as open, even though it is not actually open at the moment the results are provided to the user. In some implementations, as described further below, a user can select a time of interest other than the current time (e.g., a future date or time, or a range of time) at which location status information is desired.

In further detail, in state (D), the server system 106 assigns scores to the business results 130a-130c. The server system 106 uses the scores to determine whether the business results 130a-130c should be designated as open at the particular time of interest (e.g., the time 121).

FIG. 2 is a diagram that illustrates examples of data that can be used to designate location status. The server system 106 can include a score assignment module that assigns one or more scores to each business result 130a-130c. The assigned scores can include confidence scores, where each confidence score is a value indicative of a likelihood that a business result 130a-130c will be open at a particular time of interest. For example, the server system 106 can assign a confidence score 220 that is indicative of whether a business result 130a-130c will be open at the time 121. In addition, or as an alternative, the server system 106 can assign an arrival confidence score 270 that is indicative of whether a business result 130a-130c will be open at a time that the user 102 is estimated to arrive at a business location of the business result 130a-130c.

As described further below, the server system 106 can assign composite scores 280 that indicate the likelihood that the respective business results 130a-130c should be designated as open. The composite scores 280 are based on the confidence scores 220, the arrival confidence scores 270, or both. For example, one or more weighting or scaling factors can be applied to the confidence scores 220 or the arrival confidence scores 270 to determine the composite scores 280.

To determine the confidence scores 220 and the arrival confidence scores 270, the server system 106 can access information about operating hours 210 for each of the business results 130a-130c. The data indicating the operating hours 210 can be accessed from, for example, an index stored in one or more data storage devices in communication with the server system 106 (not shown). The data in the index can be acquired from multiple sources, for example, representatives of businesses, web pages for the businesses, public records, or third parties. In some implementations, information about operating hours 210 is acquired from a directory service that aggregates operating hours data for multiple businesses.

In some implementations, users can choose to provide information about operating hours, and that information can be included in the index. For example, users can submit information that states the operating hours 210 for a business. As another example, users can give permission for the server system 106 to access "check-in" data indicating that the computing device 104 was located at a location at a particular time. As described above, users can be provided an opportunity to opt-in or opt-out of using features that collect information about the users. The check-in data can be anonymized so that it cannot be linked to a user identity. Check-in data may include, for example, a location (e.g., GPS coordinates) and a timestamp. Because users are generally admitted at a location only when the location is open, the timestamps of check-in data can indicate when the location is open. As another example, users may give permission for the server system 106 to access timestamps and locations associated with photographs taken at a location during the operating hours. As another example, users may provide feedback indicating that operating hours presented are incorrect or incomplete, and the server system 106 can update the operating hours 210 in response.

The different sources of information for operating hours 210 can have different levels of reliability. The reliability of different information sources can be determined, and a reliability score, indicative of the reliability of the information source, can be associated with each information source.

In some implementations, sources that are determined to be reliable (e.g., sources determined to have reliability scores at or above a first predetermined threshold) can be included in a whitelist. Unreliable sources (e.g., sources determined to have reliability scores below a second predetermined threshold) can be included in a blacklist, and data from blacklisted sources can be ignored. The index of operating hours 210 can be created using only data that are either (i) provided by a whitelisted source or (ii) agreed upon by two or more sources that are not on the blacklist. Data provided by a single whitelisted source can be trusted without further verification. In order for data from non-whitelisted sources to be included in the index of operating hours 210, confirmation can be required from at least one other source. Thus the index of operating hours 210 indicates data from a trusted source or data verified among multiple sources.

A second source can confirm the data of a first source by, for example, independently indicating the same range of operating hours the first source. In some implementations, the beginning and ending times of the operating hours indicated by two sources can be required to match each other. When the beginning or ending times do not match, the operating hours for neither source can be used. As an alternative, in some implementations, an overlapping range of time indicated by two different sources can be considered reliable, even if the beginning and ending times are not the same. For example, if a first source indicates that a business location has operating hours from 8:00 am to 8:00 pm, and a second source indicates that it has operating hours of 9:00 am to 9:00 pm, the overlapping portion of time from 9:00 am to 8:00 pm can be used as the operating hours for the business location.

When only one source provides operating hours for a business, or when multiple sources disagree, the operating hours 210 for the business can be considered to be unknown, as if no information were available for the business. When the operating hours for a business result is unknown, the business result will not be selected as an open result, and thus will not be designated as open. For example, because operating hours 210 are unavailable for the business result 130c, the server system 106 assigns a confidence score 220 of 0% to the business result 130c, indicating that the business result 130c is not likely to be open at the time 121.

In some implementations, the index of operating hours 210 can indicate the operating hours 210 of a business with varying degrees of confidence. For example, operating hours 210 entries in the index can have associated confidence measures (not shown) based on the reliability scores of the sources that provided the operating hours 210. The greater the number of sources that agree on the operating hours 210, the greater the confidence indicated by the confidence measures assigned to the operating hours 210. Different periods of time during the operating hours 210 can have different assigned confidence measures. For example, for a single business result 130a-130c, a time period that multiple information sources indicate as open may be assigned a higher confidence measure than a time period that only one information source indicates as open.

The server system 106 uses the operating hours 210 to assign the confidence scores 220, which indicate the likelihood that the business results 130a-130c are actually open at the time 121. When the server system 106 determines that time 121 is included within the operating hours 210 for one of the business results 130a-130c, the server system assigns a confidence score 220 to the business result 130a-130c that indicates that it is likely that the business result 130a-130c is open. When the server system determines that the time 121 is outside the operating hours 210, the server system 106 assigns a confidence score 220 that indicates that it is unlikely that the business result 130a-130c is open.

The confidence scores 220 can also be based in part on confidence measures for the operating hours 210, for example, to account for uncertainty as to the accuracy of the operating hours 210. For example, even though the business result 130a and the business result 130b both have operating hours 210 that include the time 121, the confidence scores 220 are different to reflect the different levels of confidence in the accuracy of the operating hours 210.

To further account for the uncertainty in the operating hours, the server system 106 can assign the confidence scores 220 based on the proximity of the time 121 to the boundaries of the operating hours 210. The closer the time 121 is to the beginning or end of the operating hours 210, the lower the likelihood that the business result 130a-130a will be open. The server system 106 can also determine whether the time 121 is within a threshold amount of time from the boundaries of the operating hours 210. For example, the server system 106 can determine whether the time 121 is within thirty minutes of an opening or closing time of the business results 130a-130c. Other threshold times can be used, for example, two hours, one hour, or fifteen minutes. The boundaries of the operating hours 210 are more likely to be incorrect or to be changed than are the middle periods of the operating hours 210. For example, a business owner is more likely to close an hour early one day than to close for an hour in the middle of the day. Therefore, when an expected arrival time 260 is within a predetermined threshold amount of time from an opening or closing time, there may be additional uncertainty as to whether the business will be open.

In the illustrated example, the time 121 is within thirty minutes of the closing time for the business result 130a. As a result, the server system 106 assigns the confidence score 220 for the business result 130a to indicate lower confidence that the business result 130a is open than if the time 121 had been more than thirty minutes from the closing time.

When determining the confidence scores 220 (or the arrival confidence scores 270), the server system 106 can determine a time zone for the user 102. For example, the server system 106 can use the device location 120 to determine a time zone where the computing device 104 is located. This time zone can be used so that the time 121 and the times of the operating hours 210 can be compared accurately.

In some implementations, the index of operating hours 210 can be stored with respect to a common time zone, for example, coordinated universal time (UTC). Storing data about the operating hours 210 with respect to a common time zone can facilitate using the same index data in data centers in multiple different time zones. After determining the user's time zone, the server system 106 can convert the current time (e.g., the time 121) to UTC for comparison with the operating hours 210, which are stored in UTC.

As an alternative, rather than storing operating hours relative to a common time zone, the index of operating hours 210 can store, for each business result 130a-130c, data that indicates a time zone associated with the operating hours 210 for the business result 130a-130c. The server system 106 can make appropriate conversions when comparing a time in a first time zone to a time in a second, different time zone.

The server system 106 can also assign the arrival confidence scores 270, which each indicate a likelihood that the corresponding business result 130a-130c will be open when the user 102 arrives at the corresponding business location 230. The server system 106 can access data that indicates operating hours 210 and business locations 230 for each of the business results 130a-130c. Using this data, the server system 106 can determine distances 240 between the device location 120 and the business locations 230, and also determine estimated travel times 250 from the device location 120 to the business locations 230. The server system 106 can calculate estimated arrival times 260 at which the user 102 can arrive at the business locations 230. The server system 106 can then assign the arrival confidence scores 270 based on whether the estimated arrival times 260 are within the operating hours 210.

The server system 106 can identify the business locations 230 that are associated with the business results 130a-130c using location data stored in an index. The location data can be acquired from the same sources that provide operating hours information or from different sources. The business locations 230 can each include, for example, an address, latitude and longitude coordinates, or other information that indicates the geographical location associated with the business results 130a-130c. In some implementations, the business locations 230 may include a postal code or other information that indicates only an approximate location for the business results 130a-130c.

The server system 106 can determine distances 240 between the device location 120 and the business locations 230. For example, the server system 106 can access map data for a region that includes the device location 120 and the business locations 230. Using the map data, the server system 106 can determine the distances 240 between the device location 120 and the business locations 230 along roads or other transportation routes. Alternatively, the distances 240 can be linear distances between the two locations.

The server system 106 can determine estimated travel times 250 between the device location 120 and the business locations 230. For purposes of example, specific values of estimated travel times 250 are illustrated. To reflect the variability of travel times, the server system 106 can use estimation functions rather than specific values to represent estimated travel times 250. For example, each of the estimated travel times 250 can be calculated as a probability distribution function such as a probability density function (PDF). Alternatively, one or more particular estimated travel times can be used.

The server system 106 can estimate travel times using the map data. Travel times 250 may be calculated by adding together travel times or combining probability functions for travel along different segments of a route between the device location 120 and one of the business locations 230. The travel time for each segment can be based on the maximum or average speeds along the segment, and can take into account current or expected traffic conditions. Alternatively, the travel times 250 can be estimated, for example, by multiplying a standard or average speed by each distance 240.

The estimated travel times 250 can be calculated based on any of several transportation modes such as travel by walking, by public transit such as train or bus, or by car. The server system 106 can calculate the estimated travel times 250 based on a fastest transportation mode available in the geographic area, a recent transportation mode, or a transportation mode selected by the user 102. When a PDF is used to represent the estimated travel times 250, the variance of the PDFs can vary based on the mode of transportation that is used. For example, a PDF that represents travel times using a train may be calculated to have a lower variance than a PDF that represents travel times using a car. Similarly, the PDF used to estimate can take into account the time 121 at which travel is expected to occur. For example, when the travel time is calculated for travel by car and the time 121 is near a peak commute time, the travel time PDF can have a larger variance or have an increased mean or median value relative to a PDF representing travel time at a non-peak time.

Using the estimated travel times 250, the server system 106 can determine estimated arrival times 260. The estimated arrival times 260 can be represented as PDFs or other estimation functions that indicate likelihoods of various times that the user may arrive at the business locations 230. The values illustrated for the estimated arrival times 260 can represent, for purposes of example, mean or median values for the corresponding PDFs. Alternatively, estimated travel times 250 can represent earliest times that the user 102 is determined capable of arriving at the respective business locations 230. To calculate the estimated arrival times 260, the server system 106 can add the estimated travel times 250 to the time 121.

In some implementations, the server system 106 determines the estimated arrival times 260 based on an accuracy of the device location 120. The estimation function(s) or models used to represent the estimate arrival times 260 can include an error parameter to account for error in the device location 120. The error parameter can vary based on the method used to determine the device location 120. For example, the error parameter may indicate a larger error for a location determined using cellular tower signals than for a location determined using a GPS receiver. The larger the error parameter, the larger the variance in a PDF that represents the estimated arrival time 260.

The server system 106 can use the estimated arrival times 260 to determine the arrival confidence scores 270. Each arrival confidence score 270 can indicate a likelihood that the user 102, by travelling from the device location 120 at the time 121, would arrive at the business location 230 for a business result 130a-130c while the business result 130a-130c is open.

To take into account uncertainty as to the accuracy of the operating hours 210, the arrival confidence scores 270 can be based on the confidence scores 220, which reflect the uncertainty about the accuracy of the operating hours 210. Alternatively, the arrival confidence scores 270 can be based on similar factors used to assign the confidence scores 220, for example, confidence measures for the operating hours 210 and the proximity of the estimated arrival times 260 to the beginning or end of the operating hours 210.

To take into account uncertainty as to the future arrival time of the user 102 at the business locations 230, the arrival confidence scores 270 can also be based on the estimated arrival times 260 which can be expressed as PDFs. As an example, for each business result 130a-130c, the server system 106 can determine a cumulative probability that the user 102 will arrive within the operating hours 210 by integrating over the portion of the estimated arrival time PDF that overlaps with the operating hours 210. Alternatively, the server system 106 can determine one or more specific values representing estimated arrival times 260 are within the operating hours 210.

In the illustrated example, the server system 106 determines whether each of the estimated arrival times 260 falls within the operating hours 210 of the corresponding business result 130a-130c. As an example, the user 102 is expected to arrive at the business result 130a, at 9:03 pm, after the closing time of 9:00 pm. Because the user 102 likely cannot travel to the associated business location 230 before it closes, the server system 106 generates an arrival confidence score 270 for the business result 130a that indicates that the business result 130a will likely not be open by the time the user 102 arrives. Even though the business result 130a is open at the current time (e.g., 8:47 pm), designating the business result 130a as open could cause the user 102 to travel to the business location, only to arrive after the business has closed.

As another example, assume that the user 102 is expected to be able to arrive at the business location 230 for the business result 130b by 8:50 pm, which is within the operating hours 210 for the business result 130b. In this example, the server system 106 assigns an arrival confidence score 270 to the business result 130b that indicates that the business result 130b is likely to be open at a time when the user 102 can arrive.

The server system 106 can assign the composite scores 280 to the business results 130a-130c based on the arrival confidence scores 270 and other criteria. Each composite score 280 is a value indicative of a likelihood that the corresponding business result 130a-130c should be designated as open. The composite scores 280 can thus be based on any combination of the factors used to calculate the confidence scores 220 and the arrival confidence scores 270, including the likelihood that the known operating hours 210 are accurate and the likelihood that the user can arrive at the business locations 230 while they are open.

The composite scores 280 can be calculated by applying a weighting or scaling factor to the arrival confidence scores 270. For example, the arrival confidence scores 270 can be weighted by the distances 240 such that the greater the distance 240, the less likely the corresponding business result 130a-130c should be selected as open. In this manner, the distances 240 can be used to manage the risk of inconvenience to the user if the operating hours 210 are incorrect. For example, if a user travels one mile based on an indication that a business location is "open now", and the business location is closed, the inconvenience to the user 102 much less than if the user 102 had traveled fifteen miles to reach the business location only to find that it is closed. The server system 106 can assign the composite scores 280 according to the distances 240, such that the greater the distance 240, the lower the scaling factor applied to the corresponding arrival confidence score 270. A maximum distance threshold can be set such that any business results 130a-130c that have distance 240 greater than the predetermined maximum threshold distance can be excluded from being designated as open.

Returning to FIG. 1, in state (E), the server system 106 determines whether the business results 130a-130c should be designated as open. The server system 106 selects a subset of the business results 130a-130c as open results based on the composite scores 280. A score evaluation module 126 of the server system 106 evaluates the composite scores 280, for example, by comparing each composite score 280 to a predetermined threshold. If the composite score 280 for one of the business results 130a-130c meets (e.g., is greater than or equal to) the predetermined threshold, the server system 106 selects the associated business result 130a-130c as an open result. When fewer than all of the business results 130a-130c have composite scores 280 that satisfy the threshold, the open results can be a proper subset of the business results 130a-130c.

In the illustrated example, the server system 106 can use a minimum threshold of, for example, 80%. The composite score 280 assigned to the business result 130b is above the minimum threshold, and thus the server system 106 selects the business result 130b as an open result for the time 121. The composite scores 280 assigned to the other business results 130a, 130c are below the minimum threshold, so the server system 106 does not select them as open results.

Because the time zone associated with the time 121 is determined and used when assigning the composite scores 280, the selection process for the open results is time-zone aware. Business results 130a-130c that outside the time zone of the user 102 can still be accurately selected as open results. Thus a user near a time zone boundary can be presented information about open results having business locations in all nearby time zones.

In some implementations, the score evaluation module 126 can evaluate the confidence scores 220 or the arrival confidence scores 270 against predetermined thresholds rather than evaluating the composite scores 280. For example, if it is not desired to take travel time into account, the open results can be selected based on the confidence scores 220. As another example, if no scaling or other adjustments to the arrival confidence scores 270 are made, the open results can be selected based on the arrival confidence scores 270.

In state (F), the server system 106 generates a web page 140 or other data that identifies one or more of the search results 130. For example, a web page generation module 128 of the server system 106 can generate the web page 140 to include the top N results, where N is an integer.

The web page 140 can also designate one or more of the search results 130 are as open. Search results 130 can be indicated as open when the web page 140 is rendered, or after a user selects a user interface element such as a filter control. For example, open results may not be distinguished from other search results 130 when the web page 140 is first rendered. However, the user 102 can select a filter control that filters the search results 130 so that only the open results (for example, those results selected as "open now") are presented. After the filter is applied, all of the search results 130 that are presented are indicated to be open. Business results 130a-130c that are closed, or that have not been determined to be open, are filtered out by the filter control.

The web page generation module 128 can selectively include the filter control in the web page 140 based on the characteristics of the query 112 and/or the set of search results 130. Based on an evaluation of the characteristics of the search results 130, the web page generation module 128 can include the filter control when it is likely to be useful to the user 102, and omit the filter control when it is not likely to be useful, as described in more detail below. Thus when the filter control is included, it can function as a suggestion that the user 102 refine the presentation of the search results 130 to indicate those that are open.

The web page generation module 128 can determine whether or not to display the filter control based on one or more of, for example, a total number of search results 130 identified, a number of business results 130a-130c identified, and a number of open results selected. As an example, the server system 106 can generate the web page 140 to present the filter control when a predetermined condition is satisfied. The server system 106 can generate the web page 140 to not present the filter control when the predetermined condition is not satisfied.

The predetermined condition can include, for example, that the total number of open results equals or exceeds a threshold number, for example, one, five, or ten. If there are no open results in the set of search results 130, for example, the filter control can be omitted. By contrast, if there are at least the threshold number of open results, the filter control can be included. The predetermined condition can include, for example, that the total number of search results 130 meets or exceeds a minimum threshold, for example, one, five, ten, or twenty. If the total number of search results 130 is below the minimum threshold, the filter control may not be needed. In some implementations, the predetermined condition includes the number of open results satisfying a first threshold, and the number of total results identified satisfying a second threshold.

As another example, the predetermined condition can be that the number of open results in the N-highest ranked results meets or exceeds a threshold. For example, the filter control can be provided when there are at least five open results in the fifty highest-ranked search results 130.

The server system 106 can omit the filter control when the server system 106 determines that the query 112 is highly navigational, for example, when the server system 106 determines that the query 112 corresponds to specific location or business. For example, when the query 112 includes a particular address or business name that likely refers to a single business or location, the server system 106 can omit the filter control. By contrast, the filter would be more appropriate when the query 112 includes a general description like "hardware store" or "movie theater".

The server system 106 can determine whether a query is highly navigational based on the search results 130, for example, whether the highest-ranking search results have particular characteristics in common. In addition, or as an alternative, a query can be determined to be highly navigational based on user interactions with results to queries with the same or similar terms. For example, when different users often select the same result after submitting a particular set of query terms, the set of query terms is likely to be highly navigational.

As an alternative, the filter control may be displayed in the web page 140 in response to every query 112, but other features, such as formatting or a separate notification message, can be selectively included to draw the user's attention to the filter control when it is likely to be useful. For example, a link to a search result page presenting only the open results can be included on the web page 140 regardless of the query 112 and search results 130. A separate prompt suggesting that the user 102 interact with the link can be included when one or more predetermined conditions are satisfied.

In state (G), the server system 106 sends the web page 140 to the computing device 104 over the network 108. In state (H), the computing device 104 receives the web page 140, and renders the web page 140 on the user interface 110b.

The web page 140 can present the search results 130 ranked according to, for example, relevance to the terms of the query 112. The web page 140 includes a filter control 150 that can alter the presentation of the search results 130 based on whether the search results 130 are selected as open results. The user interface element can respond to user interaction by filtering or re-ordering the search results 130 that are presented. For example, in response to interaction with the filter control 150, the user interface 110b of the computing device 104 can be configured to present the subset of the search results 130 that are open results. Search results 130 that are not open results can be excluded from presentation. The filter control 150 can include a button, a checkbox, a drop down list item, or other user interface element.

The filter control 150 can be a link to a different search result web page that, when rendered, presents only the business results 130a-130c. In some implementations, the server system 106 determines which search results 130 should be selected as open results in response to interaction with the filter control 150, in addition to, or instead of, selecting open results in response to receiving the search query 112.

The user interface 110b (which displays the rendered web page 140) can also include other indications of business status. For example, a notification 152 can be presented to indicate that the business result 130b is an open result, for example, that the business result 130b is "open now."

In some implementations, the server system 106 assigns each of the business results 130a-130c to one of three groups: open results, closed results, and uncertain status results. The open results can be business results, such as the business result 130b, for which there is a high likelihood (e.g., a confidence score above a threshold value) that they are open at time of interest. The closed results can be business results 130a-130c that are likely to be closed at a time of interest (e.g., a confidence score that the business is closed is above a threshold value). The uncertain status results can be business results 130a-130c that are not selected as open results or closed results (e.g., a confidence score is within a range that indicates uncertainty as to the status). For example, the business result 130c can be designated as an uncertain status result because operating hours are unknown.

Indications can be provided to show for the open results, the closed results, and the uncertain status results. For the uncertain status results, an indication can be provided that prompts the user 102 to independently determine the business location status, for example, "status unavailable" or "please call ahead first".

Figure 3A:
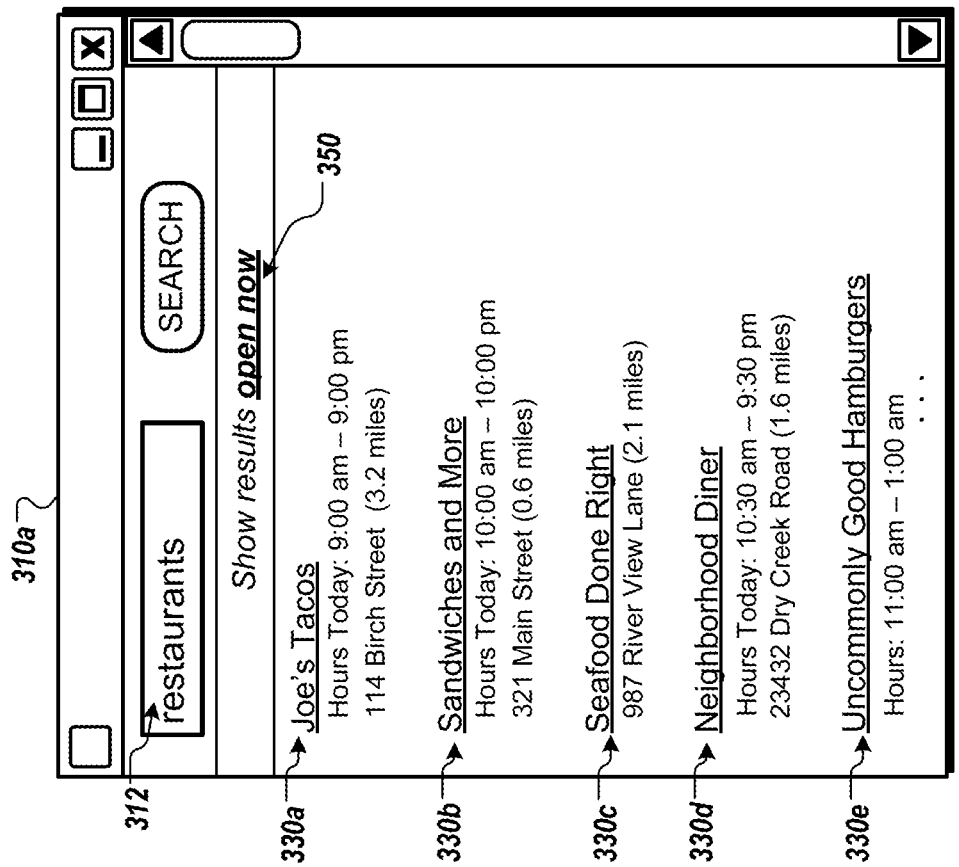

FIG. 3A is a diagram that illustrates an example of a user interface 310a for indicating location status. The user interface 310a displays a search engine results page that is rendered on, for example, a computing device. The user interface 310a displays information that identifies search results 330a-330e selected as relevant to a search query 312.

In the illustrated example, the user interface 310a does not indicate which of the search results 330a-330e are selected as open results. The search results 330a-330e that are most relevant to the search query 312 can be presented, regardless of status. The user interface 310a includes a filter control 350 that permits a user to alter the presentation of the search results 330a-330e to designate open results as being open. For example, interaction with the filter control 350 can filter the search results 330a-330e to show only search results 330a-330e that are associated with locations that are open at the current time (e.g., "open now").

FIG. 3B is a diagram that illustrates an example of a user interface 310b for indicating location status. The user interface 310b illustrates information displayed in response to user interaction with the filter control 350 of FIG. 3A. After the user interacts with the filter control 350, the user interface 310b can be displayed instead of the user interface 310a. Only open results 330b, 330d, 330e, a subset of the search results 330a-330e, are identified on the user interface 310b. A message or other indication 360 can be presented that describes the displayed results as open results and indicates that the filter has been applied.

The open results can be selected from among the search results 330a-330e and from other search results not presented on the user interface 310a. The open results can be search results 330a-330e that are open at the current time, for example, search results 330a-330e for which the current time is determined to be within the operating hours. Alternatively, the open results can be search results 330a-330e that are open at an estimated arrival time in the future, for example, at a time at which the user is likely capable of arriving at the business locations that correspond to the respective search results 330a-330e. Estimated travel times between the location of the user's computing device and the business locations can be used to determine the estimated arrival times, as described above. The open results can also be selected based on additional factors, such as distance of the corresponding business locations from the location of the computing device and the proximity of the current time or an estimated arrival time to the boundaries of the corresponding operating hours.

In some implementations, the user interface 310b illustrates a web page that is retrieved over a network in response to interaction with the filter control 350. For example, the filter control 350 can be a link to a search engine results page that indicates only open results and is different from the search engine results page displayed in the user interface 310a. In some implementations, the web page displayed on the user interface 310a can include information, including information about open results, that is not displayed, and code in the web page can cause the information to be presented, for example, in the user interface 310b without loading a different web page.

Figure 4B:
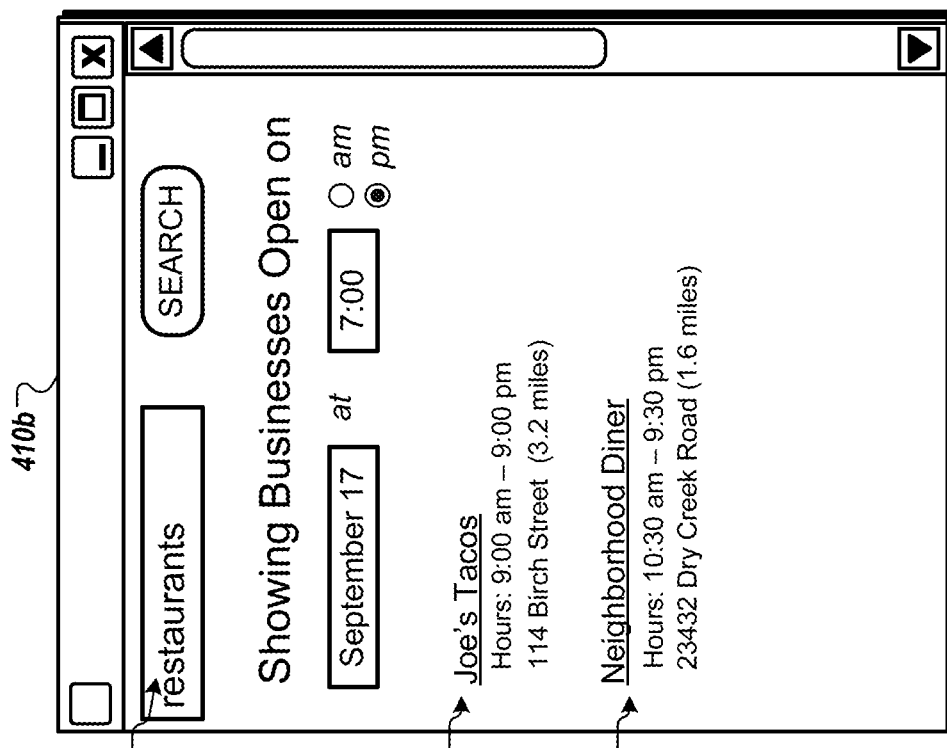
Figure 4A:
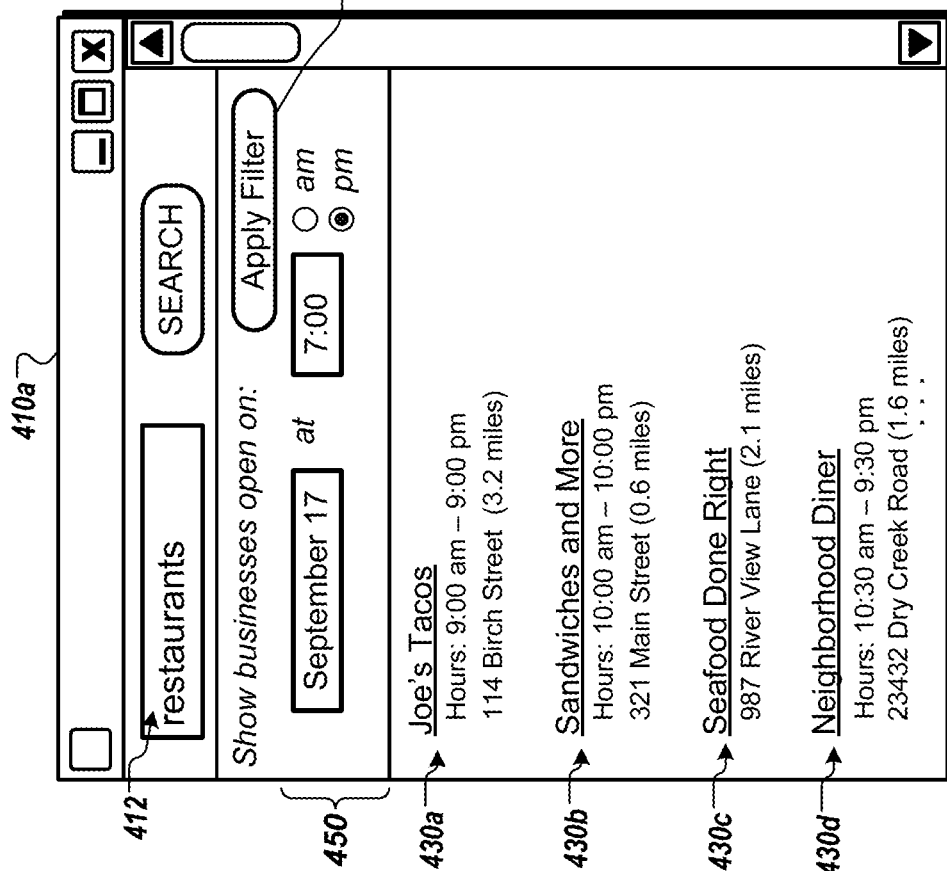

FIG. 4A is a diagram that illustrates an example of a user interface 410a for indicating location status. The user interface 410a displays a search engine results page that is rendered on, for example, a computing device. The user interface 410a displays information that identifies search results 430a-430d selected as relevant to a search query 412.

The user interface 410a presents one or more user interface elements 450 that permit a user to select a time, for example, a current time or a future time. The selected time can be a time on a current date or a future date. A filter control 455 can also be presented. By interacting with the filter control 455, the user can apply a filter to the search results 430a-430d so that businesses open at the selected time and date (e.g., a future time and date) are identified.

FIG. 4B is a diagram that illustrates an example of a user interface 410b for indicating location status. The user interface 410b illustrates information displayed in response to user interaction with the filter control 455 of FIG. 4A. After the user clicks on or otherwise interacts with the filter control 455, the user interface 410b is presented, identifying open results that are designated as open at the time and date selected by the user using the user interface elements 450. The open results can be selected as, for example, search results 430a-430d for which the selected time occurs within the operating hours corresponding to the search results 430a-430d.

In the illustrated example, the selected date and time is September 17 at 7:00 pm, which represents a time in the future. In response to a user's interaction with the filter control 455, a server system (such as the server system 106 of FIG. 1) determines operating hours for the search results 430a-430d on the selected date. Using the operating hours, the server system determines that at the selected time of 7:00 pm on September 17, the search result 430a and the search result 430*d* are scheduled to be open, and the search results 430*b*-430*c* are not scheduled to be open. As a result, the server system provides information that causes the search result 430*a* and the search result 430*d* to be identified on the user interface 410*b* as being open at the selected date and time. Search results 430*a*-430*d* corresponding to businesses that are not designated at open at the selected time are not presented.

In some implementations, the server system uses estimated travel times to select the open results that are designated as open at the selected time in the future. The server system can determine an expected device location for the computing device at the selected date and time. For example, the server system can access calendar data for a user of the computing device to determine a scheduled location where the user is expected to be located at the selected time. The server system can determine estimated arrival times for travel between the scheduled location and the business locations. If the estimated arrival times occur within the operating hours for the businesses, the corresponding search results 430*a*-430*d* can be selected as business results.

As an alternative to using calendar data for a user to determine a future location, a travel itinerary or other source of location information can be used. If information about a user's scheduled location at the selected time is unavailable, a location where the user is scheduled to be located before the scheduled time can be used. For example, the last scheduled location before the selected time can be used (e.g., a location scheduled for earlier in the day or a location for a last appointment previous to the scheduled time).

In some implementations, a user can specify a time range of interest, rather than a specific time of interest. For example, a user may indicate a range of time between a first time and a second time, for example, between 6:00 pm and 8:00 pm. The time range can be submitted with a query or used to filter results to a query previously submitted. Information about business results that are open during the time range can be presented. For example, business results can be presented that open during the time range. Alternatively, business results can be presented that are open for any portion of the time range, or for at least a minimum length of time during the time range.

Figure 5:
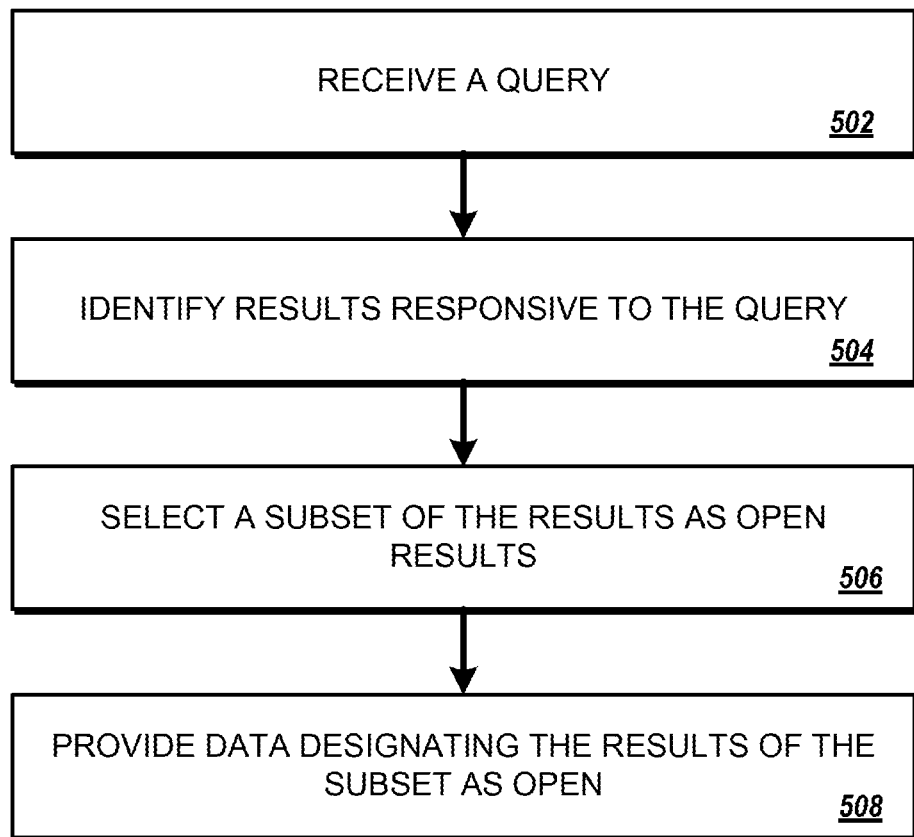
FIG. 5 is a flow diagram that illustrates an example of a process for indicating location status.

FIG. 5 is a flow diagram that illustrates an example of a process 500 for indicating location status. The process 500 may be performed, for example, by the server system 106.

A query is received from a user device (502). A current time and a location for the user device are also received. For example, information that indicates the device location can be received from the user device with the query. The device location can be a current location of the user device at the time the query is received. For example, the device location can be a location determined by a GPS module of the user device.

Results responsive to the query are identified (504). The results include one or more business results that are each associated with a business location and operating hours.

A subset of the business results are selected as open results (506). The subset can be selected based on the operating hours and a time associated with the query, for example, a current time or a future time. For example, business results can be selected as open results when the time associated with the query is within the operating hours of the business results.

The subset can be selected as open results based on the operating hours and travel times from the device location to the respective business locations. For example, travel times between the device location and the business locations can be determined (e.g., estimated) and used to determine estimated arrival times at the business locations. The estimated arrival times can represent, for example, estimates of earliest times that the user is capable of arriving at the business locations. Business results can be selected as open results if the estimated arrival times for arriving at the business locations corresponding to the business results are within the operating hours corresponding to the business results.

Selecting a subset of the business results as open results can include generating a confidence score for each of the business results. Each confidence score can indicate a likelihood that the business result and its corresponding business location are open at a particular time. For example, each confidence score can be indicative of a likelihood that the corresponding business result is open at, for example, the particular time or at an estimated time of arrival at the business location of the business result. A set of the business results can be selected as open results, the business results in the set being those business results for which the confidence score meets a threshold.

In some implementations, a confidence score indicating a likelihood that a business location for a business result is open is generated for each of the business results responsive to the query. The business results for which the confidence score is above a threshold are selected for inclusion in the subset of business results.

In some implementations, an arrival time to the business location for each business result responsive to the query is determined (e.g., estimated). For example, the arrival time may be determined by adding to the current time the travel time to the respective business locations of the business results. A business result can be selected as an open result by determining that the arrival time to the business location associated with the business result occurs between a beginning and an end of the operating hours associated with the business result.

As an additional or alternative way to select the open results from among the business results, in some implementations, travel times from the device location to the respective business locations are estimated. Based on the estimated travel times, confidence scores are generated for the business results. Each confidence score indicates a likelihood that a user can arrive at the business location associated with one of the business results during the operating hours associated with the business result. A set of the business results is selected as the open results, the business results in the set being those business results for which the confidence score meets a threshold.

Additional or alternative factors can be used to select the subset of the business results as open results. For example, a proximity of a time associated with the query to a beginning or end of the operating hours for the respective business results. For example, the confidence scores for the respective business results can be based on the proximity of the time associated with the query to a beginning or end of the operating hours for the respective business results.

The distance between the location of the user device and the business locations of the business results can be another additional or alternative factor used to select the open results. For example, distances between the device location and the respective business locations can be determined, and the confidence scores for the respective business results can be based on the distances.

The travel times to the business locations may be estimated based on the distance between the location of the user device and the business locations for the respective business results. The travel times may be based on a particular mode of transportation (e.g., walking, bicycling, traveling by bus, by car, by train, etc.) and may take into account typical traffic patterns or actual current traffic patterns, public transportation schedules, available roadways, and so on. The mode of transportation used to calculate travel times may be selected based on information received from the user device, such as user input or sensor data from the client device (e.g., current speed of the client device).

In some implementations, a fixed amount of or a fixed time range may be used as a travel time. For example, travel times for each of multiple business results may be designated to have the same value, where the value may or may not be based on distance to the business location for the business result. In some implementations, a user may specify an amount of time to represent a travel time. For example, a user may specify a particular margin of time to use when determining whether a result is indicated as open now. The user may specify that results should be indicated to be open now only if, for example, the location for the result will be open in the next 15 minutes, or 30 minutes, etc. The margin may be used as a travel time for multiple business results or all business results, rather than using individual estimates of travel times based on the respective distances to different business locations.

A time zone associated with the device location can be determined. The subset of results can be selected as open results using the determined time zone. The determined time zone can be used to compare the particular time to the operating hours relative to a common time zone. For example, the particular time can be converted from the determined time zone to a time zone in which operating hours for one or more business results are indicated. Data indicating the opening hours can be accessed from an index that stores opening hours relative to a single time zone, such as UTC.

Data for a search engine results page is provided (508). The data for the search engine results page can designate the subset of the business results as open results. For example, when the search engine results page is rendered, one or more of the open results can be identified as open.

In some implementations, data is provided for a control on the search engine results page that allows a user to toggle a display of results based on whether or not the results are open results. User interaction with the control can be detected, and data for a second search engine results page that only displays the subset of business results that are open results can be provided.

In some implementations, a label is provided for display on the results page, where the label designates at least a subset of the business results as being open now results. The subset of business results are designated for display beneath the open now label.

Providing the data can include providing data that, when rendered, displays a control that alters a display of results based on whether the results are open results. The control can filter or reorder the results based on whether the results are open results. For example, in response to user interaction with the control, the open results can be indicated to be open. In some implementations, in response to interaction with the control, a user interface is updated such that only open results are displayed.

Providing the data for the search engine results page can include detecting user interaction with the control, and providing the data for the search engine results page that designates the open results as open in response to detecting user interaction with the control. Data can be provided for a first search engine results page that includes the control. In response to interaction with the control, data can be provided for a second search engine results page that identifies the open results as open.

The control that alters the display of search results can be selectively provided. To determine whether to include the control in the search engine results page, a number of the open results can be determined. It can also be determined whether the number of open results meets a predetermined threshold. Data that, when rendered, displays a control that, in response to user interaction with the control, alters a display of results can be provided in response to determining that the number of open results meets (e.g., is higher than, or at least as high as) the predetermined threshold.

In some implementations, it is determined that a number of open results meets a first threshold, and that a number of results identified meets a second threshold. Data that, when rendered, displays a control that alters a display of results can be provided in response to (i) determining that the number of open results meets the first threshold and (ii) determining that the number of results identified meets the second threshold.

In some implementations, the open results are designated as being open at a particular time, for example, a time associated with the query. The particular time can be a time substantially the same as a time when the data for the search engine results page is provided. For example, the open results can be designated as "open now", or open at a current time that the data is provided. As an alternative, the open results can be designated as being open at a future time, such as a time and/or date selected by a user. Information indicating a future time can be received with the query, or can be received separately in response to interaction with a filter control or other user interface element of a search engine results page.

A number of implementations have been described. Nevertheless, it will be understood that various modifications may be made without departing from the spirit and scope of the disclosure. For example, various forms of the flows shown above may be used, with steps re-ordered, added, or removed.

The techniques described herein and all of the functional operations described in this specification may be implemented in digital electronic circuitry, or in computer software, firmware, or hardware, including the structures disclosed in this specification and their structural equivalents, or in combinations of one or more of them. The techniques described herein may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments be implemented in a computing system that includes a back end component, e.g., as a data server, or that includes a middleware component, e.g., an application server, or that includes a front end component, e.g., a client computer having a graphical user interface or a Web browser through which a user may interact with an implementation of the techniques described above, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

We claim:

1. A method implemented by one or more processors, the method comprising:
   receiving a query from a user device;
   identifying, based on the query and a location of the user device, one or more business results responsive to the query, the one or more business results each associated with respective operating hours;
   selecting a subset of the one or more business results as one or more currently open results based on the respective operating hours of the one or more business results and a current time;
   causing to be displayed, at an interface of the user device, a results page that:

displays the one or more currently open results, and omits displaying at least one of the business results that is excluded from the currently open results, and displays a filter control;

determining that a user has interacted with the filter control to specify a future time; and in response to determining that the user has interacted with the filter control to specify the future time:

selecting a second subset of the one or more business results as one or more future open results based on the respective operating hours of the one or more business results and the future time;

causing to be displayed, at the interface of the user device, a revised results page that displays the one or more future open results, and omits displaying at least an additional one of the business results that is excluded from the future open results.

2. The method of claim 1, wherein selecting the subset of the one or more business results as one or more currently open results further comprises:

determining an arrival time to a respective business location for each of the business results by adding to the current time a travel time to the respective business location for each of the business results; and determining that the respective arrival time to the respective business location for each of the business results occurs between a beginning and an end of the respective operating hours associated with the business result.

3. The method of claim 1, further comprising:

determining a respective distance between the current location and a respective business location for each of the currently open results;

wherein the results page further displays the respective distances.

4. The method of claim 3, wherein the distances are distances along transportation routes.

5. The method of claim 1, wherein the filter control includes a drop down list item.

6. The method of claim 1, wherein the future time is a time range.

7. The method of claim 6, wherein selecting the second subset of the one or more business results as one or more future open results based on the respective operating hours of the one or more business results and the future time comprises:

selecting the second subset based on the respective operating hours of the second subset indicating that the one or more business results, of the second subset, are open for at least a minimum length of time during the time range.

8. The method of claim 6, wherein selecting the second subset of the one or more business results as one or more future open results based on the respective operating hours of the one or more business results and the future time comprises:

selecting the second subset based on the respective operating hours of the second subset indicating that the one or more business results, of the second subset, are open for any portion of the time range.

9. The method of claim 1, wherein causing to be displayed, at the interface of the user device, the results page, comprises sending the results page to the user device over a network.

10. A system comprising:

one or more processors; and a non-transitory computer-readable medium coupled to the one or more processors having instructions stored thereon which, when executed by the one or more processors, cause the one or more processors to perform operations that include:

receiving a query from a user device;

identifying, based on the query and a location of the user device, one or more business results responsive to the query, the one or more business results each associated with respective operating hours;

causing to be displayed, at an interface of the user device and in response to the query, a results page that:

displays at least an initial subset of the one or more business results, and displays a filter control;

determining that a user has interacted with the filter control, displayed in response to the query, to specify a current time;

in response to determining that the user has interacted with the filter control to specify the current time:

selecting a currently open subset of the one or more business results as one or more currently open results based on the respective operating hours of the one or more business results and the current time; and causing to be displayed, at the interface of the user device and in response to the query, a revised results page that:

displays the one or more currently open results, and omits displaying at least one of the business results that is excluded from the currently open results, and displays the filter control;

determining that a user has interacted with the filter control, displayed in the revised results page, to specify a future time; and in response to determining that the user has interacted with the filter control to specify the future time:

selecting a future open subset of the one or more business results as one or more future open results based on the respective operating hours of the one or more business results and the future time; and causing to be displayed, at the interface of the user device, a revised results page that displays the one or more future open results, and omits displaying at least an additional one of the business results that is excluded from the future open results.

11. The system of claim 10, wherein selecting the currently open subset of the one or more business results as one or more currently open results further comprises:

determining an arrival time to a respective business location for each of the business results by adding to the current time a travel time to the respective business location for each of the business results; and determining that the respective arrival time to the respective business location for each of the business results occurs between a beginning and an end of the respective operating hours associated with the business result.

12. The system of claim 10, wherein the instructions, when executed by the one or more processors, further cause one or more of the processors to perform further operations that include:

determining a respective distance between the current location and a respective business location for each of the currently open results;

wherein the results page further displays the respective distances.

13. The system of claim 12, wherein the distances are distances along transportation routes.

14. The system of claim 10, wherein the filter control includes a drop down list item.

15. The system of claim 10, wherein the future time is a time range.

16. The system of claim 15, wherein selecting the second subset of the one or more business results as one or more future open results based on the respective operating hours of the one or more business results and the future time comprises:
   selecting the second subset based on the respective operating hours of the second subset indicating that the one or more business results, of the second subset, are open for at least a minimum length of time during the time range.

17. The system of claim 15, wherein selecting the second subset of the one or more business results as one or more future open results based on the respective operating hours of the one or more business results and the future time comprises:
   selecting the second subset based on the respective operating hours of the second subset indicating that the one or more business results, of the second subset, are open for any portion of the time range.

18. The system of claim 10, wherein causing to be displayed, at the interface of the user device, the results page, comprises sending the results page to the user device over a network.

\* \* \* \* \*